(12) United States Patent
Yasumatsu et al.

(10) Patent No.: US 11,353,785 B2
(45) Date of Patent: Jun. 7, 2022

(54) LIGHT SOURCE DEVICE AND PROJECTOR

(71) Applicant: SEIKO EPSON CORPORATION, Tokyo (JP)

(72) Inventors: Wataru Yasumatsu, Azumino (JP); Tomoko Akagawa, Matsumoto (JP); Koya Shiratori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/105,978

(22) Filed: Nov. 27, 2020

(65) Prior Publication Data

US 2021/0165312 A1 Jun. 3, 2021

(30) Foreign Application Priority Data

Nov. 28, 2019 (JP) ................. 2019-215073

(51) Int. Cl.
 *G03B 21/20* (2006.01)
 *G03B 33/12* (2006.01)
 *H04N 9/31* (2006.01)

(52) U.S. Cl.
 CPC ....... *G03B 21/204* (2013.01); *G03B 21/2013* (2013.01); *G03B 21/2066* (2013.01); *G03B 33/12* (2013.01); *H04N 9/3161* (2013.01); *H04N 9/3164* (2013.01)

(58) Field of Classification Search
 CPC .............. G03B 21/204; G03B 21/2013; G03B 21/2066; G03B 22/12; H04N 9/3161; H04N 9/3164
 USPC ......................................................... 353/85
 See application file for complete search history.

(56) References Cited

U.S. PATENT DOCUMENTS

| 2008/0232084 | A1  | 9/2008 | Kon |
|---|---|---|---|
| 2014/0153276 | A1* | 6/2014 | Nozaki ................. H01S 5/0087 362/551 |
| 2015/0036107 | A1  | 2/2015 | Nagahara et al. |
| 2016/0084451 | A1  | 3/2016 | Annen et al. |
| 2019/0097095 | A1* | 3/2019 | Yamanaka .............. F21S 41/39 |

FOREIGN PATENT DOCUMENTS

| JP | 2008-235439 A | 10/2008 |
|---|---|---|
| JP | 2015-045843 A | 3/2015 |
| JP | 2016-066480 A | 4/2016 |
| JP | 2016-099577 A | 5/2016 |

* cited by examiner

*Primary Examiner* — Jerry L Brooks
(74) *Attorney, Agent, or Firm* — Dority & Manning, P.A.

(57) ABSTRACT

Alight source device according to the present disclosure includes a light source section configured to emit first light in a first wavelength band, a first optical element configured to collect the first light emitted from the light source section, a second optical element having a first plane of incidence and a first exit surface, and a wavelength conversion element having a second plane of incidence and a second exit surface, and configured to convert the first light entering the wavelength conversion element through the second plane of incidence into second light having a second wavelength band, wherein the second optical element and the wavelength conversion element are disposed in a state in which the first exit surface and the second plane of incidence are opposed to each other at a distance from each other, and the second plane of incidence is larger in size than the first exit surface.

18 Claims, 4 Drawing Sheets

LIGHT SOURCE DEVICE AND PROJECTOR

The present application is based on, and claims priority from JP Application Serial Number 2019-215073, filed Nov. 28, 2019, the disclosure of which is hereby incorporated by reference herein in its entirety.

BACKGROUND

1. Technical Field

The present disclosure relates to a light source device and a projector.

2. Related Art

In recent years, some of illumination devices used for projectors use fluorescence as illumination light. For example, in JP-A-2008-235439, there is disclosed a light source device provided with a light source section, a condenser lens, a rod lens, and a phosphor sheet.

In the light source device described above, since the rod lens and the phosphor sheet have contact with each other, there is a possibility that the fluorescence generated in the phosphor sheet is guided toward the rod lens to thereby be emitted outside, and thus, the light use efficiency decreases.

SUMMARY

In order to solve the problem described above, a light source device according to an aspect of the present disclosure includes a light source section configured to emit first light in a first wavelength band, a first optical element configured to collect the first light emitted from the light source section, a second optical element having a first plane of incidence which the first light collected by the first optical element enters, and a first exit surface different from the first plane of incidence, and configured to guide the first light entering the second optical element through the first plane of incidence to emit the first light from the first exit surface, and a wavelength conversion element having a second plane of incidence which the first light emitted from the first exit surface of the second optical element enters, and a second exit surface different from the second plane of incidence, and configured to convert the first light entering the wavelength conversion element through the second plane of incidence into second light having a second wavelength band different from the first wavelength band, wherein the second optical element and the wavelength conversion element are disposed in a state in which the first exit surface and the second plane of incidence are opposed to each other at a distance from each other, and the second plane of incidence is larger in size than the first exit surface.

The light source device according to the aspect of the present disclosure may further include a first substrate configured to hold the wavelength conversion element and thermally coupled to the wavelength conversion element, wherein the second optical element may have a side surface crossing the first plane of incidence and the first exit surface, the first substrate may have a first surface opposed to the side surface, and the side surface and the first surface of the first substrate may be disposed at a distance from each other.

The light source device according to the aspect of the present disclosure may be configured such that a gap between the side surface and the first surface is larger in size than a gap between the first exit surface and the second plane of incidence.

In the light source device according to the aspect of the present disclosure, the wavelength conversion element may have a first film which is disposed on the second plane of incidence, transmits the first light, and reflects the second light.

In the light source device according to the aspect of the present disclosure, the wavelength conversion element may include a wavelength conversion layer configured to perform wavelength conversion of the first light entering the wavelength conversion element through the second plane of incidence into the second light, and a second substrate which holds the wavelength conversion layer, and is thermally coupled to the wavelength conversion layer, and has a light transmissive property.

A projector according to an aspect of the present disclosure includes the light source device described above, a light modulation device configured to modulate light from the light source device in accordance with image information to thereby form image light, and a projection optical system configured to project the image light.

DESCRIPTION OF AN EXEMPLARY EMBODIMENT

Hereinafter, an embodiment of the present disclosure will be described in detail with reference to the drawings.

It should be noted that the drawings used in the following description show characteristic parts in an enlarged manner in some cases for the sake of convenience in order to make the features easy to understand, and the dimensional ratios between the constituents and so on are not necessarily the same as actual ones.

Projector

The projector according to the present embodiment is an example of a projector using three transmissive liquid crystal light valves.

Figure 1:
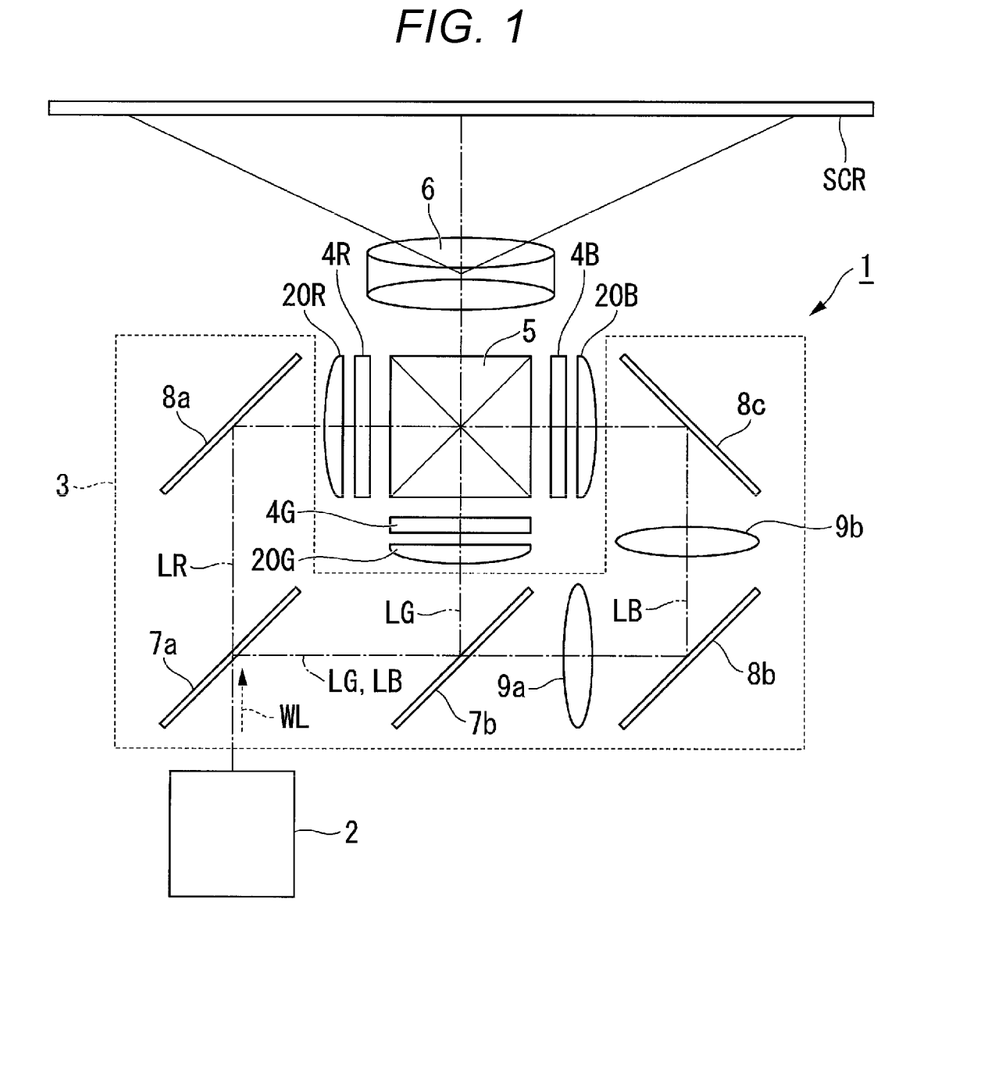
FIG. 1 is a schematic configuration diagram showing a projector.
Figure 2:
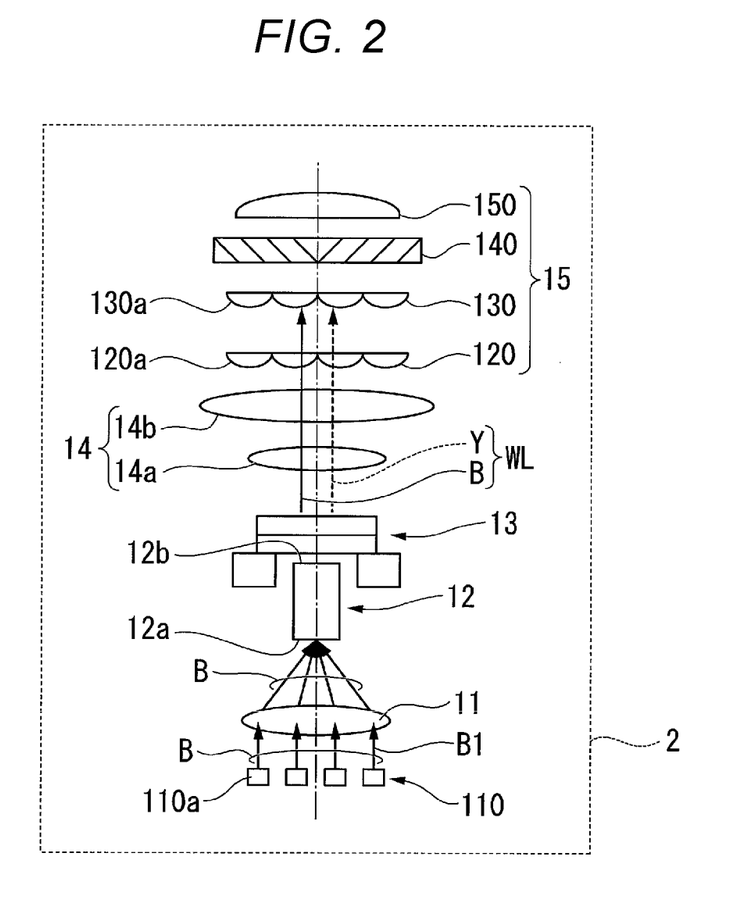
FIG. 2 is a schematic configuration diagram showing a light source device.

FIG. 1 is a schematic configuration diagram showing the projector according to the present embodiment. FIG. 2 is a schematic configuration diagram showing a light source device according to the present embodiment.

As shown in FIG. 1, the projector 1 is provided with a light source device 2, a color separation optical system 3, a light modulation device 4R, a light modulation device 4G, a light modulation device 4B, a light combining optical system 5, and a projection optical system 6. The light source device 2 performs irradiation with illumination light WL having a white color. The color separation optical system 3 separates the illumination light WL from the light source device 2 into red light LR, green light LG, and blue light LB. The light modulation device 4R, the light modulation device 4G, and the light modulation device 4B respectively modulate the red light LR, the green light LG, and the blue light LB in accordance with image information to form image light of the respective colors. The light combining optical system 5 combines the image light of the respective colors from the respective light modulation devices 4R, 4G, and 4B with each other. The projection optical system 6 projects the image light combined by the light combining optical system 5 toward a screen SCR.

The light source device 2 emits the illumination light (white light) WL having a white color obtained by combining a part of excitation light having a blue color which is emitted from a semiconductor laser and is further emitted without being converted in wavelength, and the fluorescence having a yellow color generated by the wavelength conversion of the excitation light with the phosphor with each other. The light source device 2 emits the illumination light WL regulated so as to have a substantially homogenous illuminance distribution toward the color separation optical system 3. A specific configuration of the light source device 2 will be described later.

The color separation optical system 3 is provided with a first dichroic mirror 7a, a second dichroic mirror 7b, a first reflecting mirror 8a, a second reflecting mirror 8b, a third reflecting mirror 8c, a first relay lens 9a and a second relay lens 9b.

The first dichroic mirror 7a separates the illumination light WL having been emitted from the light source device 2 into the red light LR, and the light including the green light LG and the blue light LB mixed with each other. Therefore, the first dichroic mirror 7a has a property of transmitting the red light LR, while reflecting the green light LG and the blue light LB. The second dichroic mirror 7b separates the light including the green light LG and the blue light LB mixed with each other into the green light LG and the blue light LB. Therefore, the second dichroic mirror 7b has a property of reflecting the green light LG, while transmitting the blue light LB.

The first reflecting mirror 8a is disposed in the light path of the red light LR, and thus, the red light LR having been transmitted through the first dichroic mirror 7a is reflected by the first reflecting mirror 8a toward the light modulation device 4R. The second reflecting mirror 8b and the third reflecting mirror 8c are disposed in the light path of the blue light LB, and the blue light LB having been transmitted through the second dichroic mirror 7b is guided by the second reflecting mirror 8b and the third reflecting mirror 8c to the light modulation device 4B. The second dichroic mirror 7b reflects the green light LG toward the light modulation device 4G.

The first relay lens 9a and the second relay lens 9b are disposed in a posterior stage of the second dichroic mirror 7b in the light path of the blue light LB. The first relay lens 9a and the second relay lens 9b compensate the light loss of the blue light LB due to the fact that the optical path length of the blue light LB becomes longer than the optical path lengths of the red light LR and the green light LG.

The light modulation device 4R, the light modulation device 4G, and the light modulation device 4B are each formed of a liquid crystal panel. The light modulation device 4R, the light modulation device 4G, and the light modulation device 4B modulate the red light LR, the green light LG, and the blue light LB in accordance with the image information while transmitting the red light LR, the green light LG, and the blue light LB, respectively, to thereby form the image light corresponding to the respective colors. On the light incident side and the light exit side of each of the light modulation device 4R, the light modulation device 4G, and the light modulation device 4B, there are disposed polarization plates (not shown), respectively.

On the light incident side of the light modulation device 4R, the light modulation device 4G, and the light modulation device 4B, there are disposed a field lens 20R, a field lens 20G, and a field lens 20B for collimating the red light LR, the green light LG, and the blue light LB entering the light modulation device 4R, the light modulation device 4G, and the light modulation device 4B, respectively.

The light combining optical system 5 is formed of a cross dichroic prism. The light combining optical system 5 combines the image light from the light modulation device 4R, the image light from the light modulation device 4G, and the image light from the light modulation device 4B with each other, and then emits the image light thus combined toward the projection optical system 6.

The projection optical system 6 is formed of a projection lens group. The projection optical system 6 projects the image light combined by the light combining optical system 5 toward the screen SCR in an enlarged manner. Thus, a color picture (image) thus enlarged is displayed on the screen SCR.

Light Source Device

Then, the light source device 2 in the present embodiment will be described.

FIG. 2 is a diagram showing a schematic configuration of the light source device 2.

As shown in FIG. 2, the light source device 2 is provided with an excitation light source (a light source section) 110, a condenser lens (a first optical element) 11, a light guide (a second optical element) 12, a fluorescence emitting element (a wavelength conversion element) 13, a pickup optical system 14, an integrator optical system 15, and a radiator substrate (a first substrate) 17.

The excitation light source 110 includes a plurality of semiconductor lasers 110a for emitting blue light beams B1 each formed of a laser beam. The wavelength band of the emission intensity of the blue light beams B1 is in a range of, for example, 445 nm through 465 nm, and the peak wavelength thereof is, for example, 455 nm. The plurality of semiconductor lasers 110a is arranged in an array in a plane perpendicular to an illumination light axis 100ax. It should be noted that the wavelength band of the blue light beams B1 emitted from the semiconductor lasers 110a is not limited to the above.

The excitation light source 110 in the present embodiment emits the excitation light (first light) B formed of a pencil including the plurality of blue light beams B1 in a blue wavelength band (a first wavelength band) toward the fluorescence emitting element 13.

The condenser lens 11 converges the excitation light B emitted from the excitation light source 110 to make the excitation light B enter the light guide 12.

The light guide 12 has a plane of incidence of light (a first plane of incidence) 12a, a light exit surface (a first exit surface) 12b, and a side surface 12c. The plane of incidence of light 12a is a surface which the excitation light B converged by the condenser lens 11 enters. The light exit surface 12b is a surface different from the plane of incidence of light 12a, and is a surface from which a part of the light having propagated through the light guide 12 is emitted. The side surface 12c is a surface crossing the plane of incidence of light 12a and the light exit surface 12b.

The light guide 12 in the present embodiment emits a part of the light having propagated inside the light guide 12 from the light exit surface 12b while propagating the light having entered the inside from the plane of incidence of light 12a due to total reflection. The light guide 12 is formed of a rod lens extending in a central axis direction. The light guide 12 in the present embodiment has a prismatic shape in which the cross-sectional area perpendicular to the central axis does not change in a direction from the plane of incidence of light 12*a* toward the light exit surface 12*b*.

The light guide 12 is formed of a light transmissive material such as borosilicate glass such as BK7, quartz, quart, quartz crystal, or sapphire. The light guide 12 in the present embodiment is formed of, for example, quartz having a property low in absorption of the light in the blue wavelength band. It is possible for the light guide 12 in the present embodiment to efficiently propagate the excitation light B to guide the excitation light B to the fluorescence emitting element 13.

Further, the excitation light B having entered the light guide 12 propagates through the light guide 12 while being totally reflected to thereby be emitted from the light exit surface 12*b* in the state in which the homogeneity of the illuminance distribution is improved. The excitation light B improved in the homogeneity of the illuminance distribution by the light guide 12 enters the fluorescence emitting element 13. The fluorescence emitting element 13 is excited by the excitation light B to thereby generate and then emit the fluorescence (second light) Y.

Apart of the excitation light B having entered the fluorescence emitting element 13 is emitted through the fluorescence emitting element 13. In other words, the fluorescence emitting element 13 emits the white illumination light WL including a part of the excitation light B and the fluorescence Y combined with each other. The configuration of the fluorescence emitting element 13 will be described later.

The pickup optical system 14 is provided with, for example, a first lens 14*a* and a second lens 14*b*. The pickup optical system 14 substantially collimates the illumination light WL emitted from the fluorescence emitting element 13. The first lens 14*a* and the second lens 14*b* are each formed of a convex lens.

The integrator optical system 15 is provided with, for example, a first lens array 120, a second lens array 130, a polarization conversion element 140, and a superimposing lens 150. The first lens array 120 has a plurality of first lenses 120*a* for dividing the illumination light WL emitted from the pickup optical system 14 into a plurality of partial light beams. The plurality of first lenses 120*a* is arranged in a matrix in a plane perpendicular to the illumination light axis 100*ax*.

The second lens array 130 has a plurality of second lenses 130*a* corresponding respectively to the plurality of first lenses 120*a* of the first lens array 120. The second lens array 130 forms images of the first lenses 120*a* of the first lens array 120 in the vicinity of each of the image forming areas of the light modulation device 4R, the light modulation device 4G, and the light modulation device 4B in cooperation with the superimposing lens 150. The plurality of second lenses 130*a* is arranged in a matrix in a plane perpendicular to the illumination light axis 100*ax*.

The polarization conversion element 140 converts the illumination light WL emitted from the second lens array 130 into linearly polarized light. The polarization conversion element 140 is provided with, for example, a polarization split film and a wave plate (both not shown).

The partial light beams emitted from the polarization conversion element 140 are converged by the superimposing lens 150 and are superimposed on each other in the vicinity of each of the image forming areas of the light modulation device 4R, the light modulation device 4G, and the light modulation device 4B. The first lens array 120, the second lens array 130, and the superimposing lens 150 constitute the integrator optical system 15 for homogenizing the intensity distribution of the light from the fluorescence emitting element 13.

Wavelength Conversion Element

Then, the fluorescence emitting element 13 in the present embodiment will be described.

Figure 3:
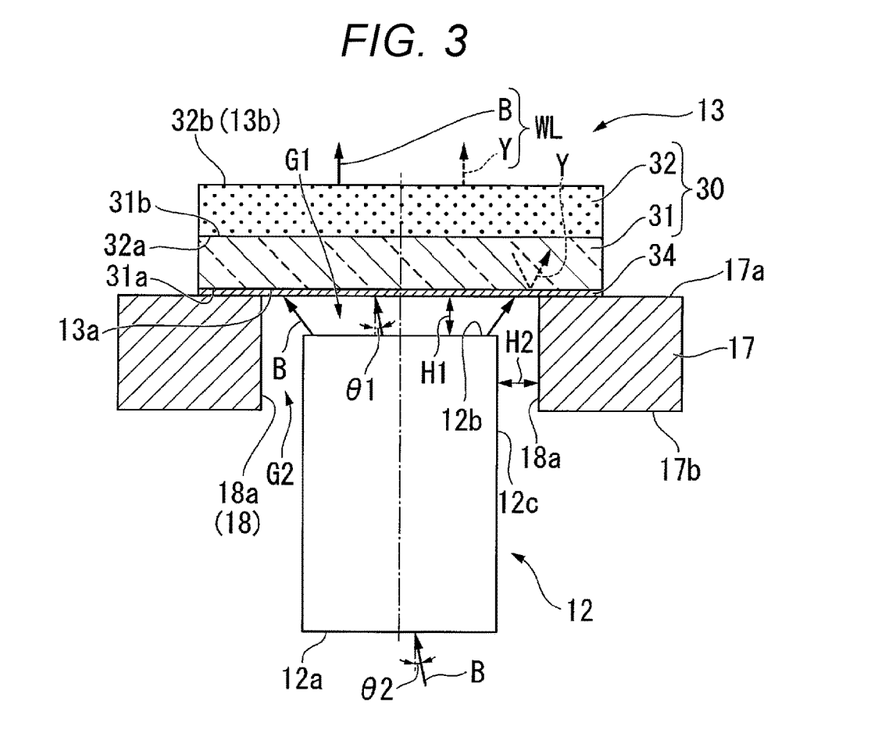
FIG. 3 is a cross-sectional view of a fluorescence emitting element.
Figure 4:
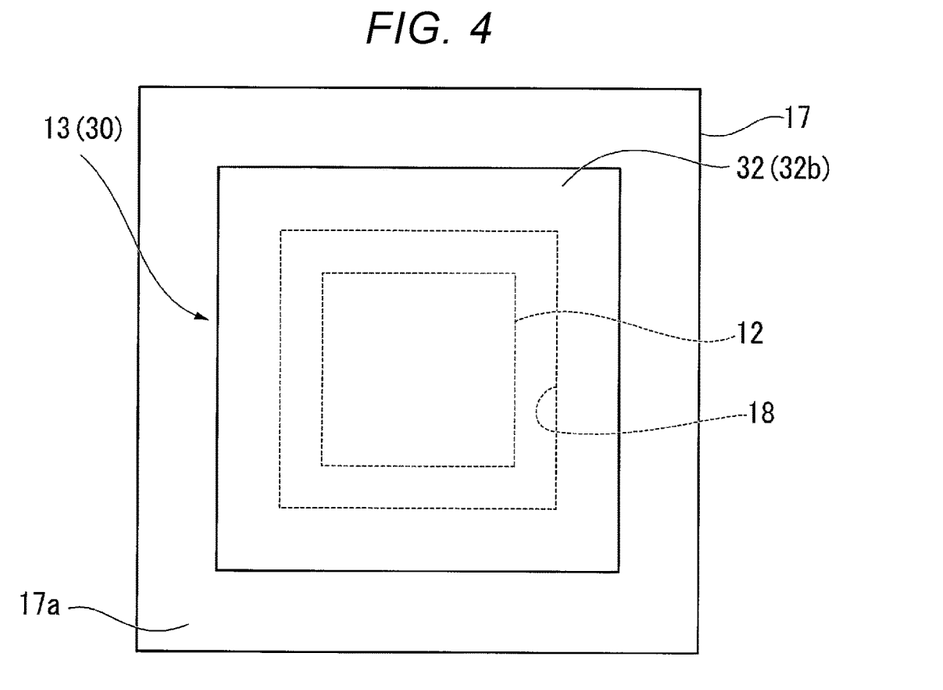
FIG. 4 is a plan view of a wavelength conversion element.

FIG. 3 is a cross-sectional view of the fluorescence emitting element 13 cut along a plane including the illumination light axis 100*ax* shown in FIG. 2. FIG. 4 is a plan view of the wavelength conversion element 30 viewed from an exit side of the fluorescence Y. It should be noted that in FIG. 3 and FIG. 4, the light guide 12 disposed in the vicinity of the fluorescence emitting element 13 is also illustrated.

As shown in FIG. 3 and FIG. 4, the fluorescence emitting element 13 is held by the radiator substrate 17. The radiator substrate 17 is formed of a metal material excellent in radiation performance such as aluminum or copper. The radiator substrate 17 is a holding member for holding the fluorescence emitting element 13. The radiator substrate 17 has a support surface 17*a* and a reverse surface 17*b*. The support surface 17*a* is a surface for supporting the fluorescence emitting element 13. The reverse surface 17*b* is a surface facing opposite to the support surface 17*a*. The fluorescence emitting element 13 is fixed to the support surface 17*a* of the radiator substrate 17 via a bonding material (not shown) so as to close a through hole 18 provided to the radiator substrate 17.

The radiator substrate 17 in the present embodiment holds the fluorescence emitting element 13, and is at the same time thermally coupled to the fluorescence emitting element 13. The excitation light B enters the fluorescence emitting element 13 via the through hole 18 provided to the radiator substrate 17. As described later, the fluorescence emitting element 13 converts the excitation light B to generate the fluorescence Y. The radiator substrate 17 is a member for releasing the heat generated in the fluorescence emitting element 13 when generating the fluorescence.

The fluorescence emitting element 13 in the present embodiment is provided with a support substrate (a second substrate) 31, a wavelength conversion layer 32, and a dichroic film (a first film) 34.

The support substrate 31 is formed of a plane member having a light transmissive property and a rectangular shape, and has a first surface 31*a* and a second surface 31*b*. The support substrate 31 holds the wavelength conversion layer 32, and is at the same time thermally coupled to the wavelength conversion layer 32. The support substrate 31 is formed of a material excellent in radiation performance and at the same time having a light transmissive property such as SiC or sapphire.

The wavelength conversion layer 32 is disposed on the second surface 31*b* of the support substrate 31. The wavelength conversion layer 32 is formed of a phosphor layer including phosphor particles (not shown) which convert the excitation light B having a blue color into the fluorescence (second light having a second wavelength band) Y having a yellow color, and then emit the fluorescence Y. As the phosphor particles, there is used, for example, a YAG (yttrium aluminum garnet) based phosphor. It should be noted that the constituent material of the phosphor particles can be unique, or it is also possible to use a mixture of the particles formed using two or more types of materials. As the wavelength conversion layer 32, a material excellent in heat resistance and surface workability is preferably used. As such a wavelength conversion layer 32, a phosphor layer obtained by dispersing phosphor particles in an inorganic binder such as alumina, a phosphor layer obtained by sintering the phosphor particles without using the binder, or the like is preferably used.

The wavelength conversion layer 32 has a plane of incidence of light 32a opposed to the second surface 31b of the support substrate 31, and a light exit surface 32b facing opposite to the plane of incidence of light 32a. The plane of incidence of light 32a is a surface through which the light is made to enter the inside of the wavelength conversion layer 32a. The light exit surface 32b is a surface through which the light is emitted from the inside of the wavelength conversion layer 32 toward the outside.

The fluorescence emitting element 13 has a plane of incidence of light (a second plane of incidence) 13a and a light exit surface (a second exit surface) 13b. The plane of incidence of light 13a is a surface which the excitation light B emitted from the light exit surface 12b of the light guide 12 enters. The light exit surface 13b is a surface different from the plane of incidence of light 13a, and is a surface through which the light is emitted from the fluorescence emitting element 13.

In the fluorescence emitting element 13 in the present embodiment, the plane of incidence of light 13a corresponds to a part exposed to the inside of the through hole 18 out of the first surface 31a of the support substrate 31, and the light exit surface 13b corresponds to the light exit surface 32b of the wavelength conversion layer 32.

The fluorescence emitting element 13 in the present embodiment emits the illumination light WL having a white color obtained by combining a part of the excitation light B which has failed to be converted into the fluorescence in the wavelength conversion layer 32, and the fluorescence Y with each other from the light exit surface 13b.

In the fluorescence emitting element 13 in the present embodiment, the heat generated in the wavelength conversion layer 32 when generating the fluorescence Y is transferred to the support substrate 31 thermally coupled to the wavelength conversion layer 32, and the radiator substrate 17 thermally coupled to the support substrate 31. Thus, in the fluorescence emitting element 13 in the present embodiment, it is possible to efficiently release the heat of the wavelength conversion layer 32.

A part of the light guide 12 is inserted into the through hole 18 provided to the radiator substrate 17. The light exit surface 12b of the light guide 12 and the plane of incidence of light 13a of the fluorescence emitting element 13 are opposed to each other. The size of the plane of incidence of light 13a is made larger than the size of the light exit surface 12b of the light guide 12. In other words, the area of the plane of incidence of light 13a is larger than the area of the light exit surface 12b.

The excitation light B emitted from the light exit surface 12b enters the plane of incidence of light 13a of the fluorescence emitting element 13 in a state of having a predetermined spread. In the fluorescence emitting element 13 in the present embodiment, since the plane of incidence of light 13a is larger than the light exit surface 12b, the excitation light B having the predetermined spread is efficiently taken in the plane of incidence of light 13a.

The light guide 12 and the fluorescence emitting element 13 are disposed in a state in which the light exit surface 12b and the plane of incidence of light 13a are opposed to each other at a distance from each other. In other words, between the light exit surface 12b and the plane of incidence of light 13a, there is disposed a first gap G1. In the first gap G1, there is disposed an air layer.

Here, when assuming that the light exit surface 12b and the plane of incidence of light 13a have contact with each other, there is a possibility that a part of the fluorescence Y generated in the fluorescence emitting element 13 is guided from the plane of incidence of light 13a toward the light exit surface 12b. In other words, the light use efficiency of the fluorescence Y decreases, wherein a part of the fluorescence Y generated in the fluorescence emitting element 13 is returned to the inside of the light guide 12 to thereby cause a loss.

In contrast, in the light source device 2 according to the present embodiment, the first gap G1 is disposed between the light exit surface 12b and the plane of incidence of light 13a to thereby prevent the light exit surface 12b and the plane of incidence of light 13a from having contact with each other. Thus, it is possible to prevent the fluorescence Y from being guided from the plane of incidence of light 13a toward the light exit surface 12b.

Further, in the light source device 2 according to the present embodiment, by preventing the light exit surface 12b and the plane of incidence of light 13a from having contact with each other, it is possible to prevent the heat generated in the fluorescence emitting element 13 from being transferred to the light guide 12. Therefore, it is possible to prevent the occurrence of a problem incurring the degradation of the reliability such as deterioration or breakage of the light guide 12 exposed to the heat.

In order to make the excitation light B efficiently enter the fluorescence emitting element 13, it is desirable to dispose the light exit surface 12b and the plane of incidence of light 13a as close as possible to each other. In other words, it is desirable to set the size H1 of the first gap G1 described above to be as small as possible.

The radiator substrate 17 in the present embodiment has an inner surface 18a (a first surface) opposed to the side surface 12c of the light guide 12. The light guide 12 and the radiator substrate 17 are disposed in a state in which the side surface 12c and the inner surface 18a are opposed to each other at a distance from each other. In other words, between the side surface 12c and the inner surface 18a, there is disposed a second gap G2. In the second gap G2, there is disposed an air layer.

Here, when the inner surface 18a of the through hole 18 and the side surface 12c of the light guide 12 have contact with each other, the excitation light B propagating through the light guide 12 is absorbed by the radiator substrate 17 to thereby cause a light loss.

In contrast, in the light source device 2 according to the present embodiment, the second gap G2 is disposed between the inner surface 18a and the side surface 12c to thereby prevent the inner surface 18a and the side surface 12c from having contact with each other. Thus, it is possible to prevent the light loss caused by the radiator substrate 17 absorbing the excitation light B from occurring.

Further, in the light source device 2 according to the present embodiment, by preventing the inner surface 18a and the side surface 12c from having contact with each other, it is possible to prevent the heat having been transferred from the fluorescence emitting element 13 to the radiator substrate 17 from being transferred to the light guide 12. Therefore, it is possible to prevent the occurrence of a problem incurring the degradation of the reliability such as deterioration or breakage of the light guide 12 exposed to the heat.

In order to suppress the damage of the light guide 12 due to the influence of the radiant heat from the radiator substrate 17, it is desirable to dispose the inner surface 18a and the side surface 12c at a distance as long as possible. In other words, it is desirable to set the size H2 of the second gap G2 described above to be as large as possible.

In the light source device 2 according to the present embodiment, by setting the size H2 of the second gap G2 relatively larger than the size H1 of the first gap G1, it is possible to prevent the occurrence of breakage or the like of the light guide 12 due to the influence of the radiant heat from the radiator substrate 17, and at the same time, efficiently guide the excitation light B toward the fluorescence emitting element 13.

Further, the light source device 2 according to the present embodiment has a dichroic film 34 disposed on the plane of incidence of light 13a of the fluorescence emitting element 13. The dichroic film 34 is a film formed by stacking a plurality of dielectric films, and has a property of transmitting the excitation light B and at the same time reflecting the fluorescence Y generated in the wavelength conversion layer 32.

As shown in FIG. 3, a part of the fluorescence Y generated in the wavelength conversion layer 32 is transmitted through the support substrate 31 to reach the plane of incidence of light 13a. The fluorescence emitting element 13 in the present embodiment is capable of preventing the fluorescence Y from being leaked to the outside by reflecting the fluorescence Y with the dichroic film 34 disposed on the plane of incidence of light 13a. Therefore, the fluorescence emitting element 13 in the present embodiment is capable of efficiently taking out the fluorescence Y generated in the wavelength conversion layer 32 to the outside from the light exit surface 13b.

In the light source device 2 according to the present embodiment, between the light exit surface 12b and the dichroic film 34, there is disposed the first gap G1 (the air layer) described above. According to this configuration, since the dichroic film 34 is capable of totally reflecting the fluorescence Y on the interface with the air layer, the film design of the dichroic film 34 becomes easy compared to when the total reflection by the interface between the dichroic film 34 and the air layer is not used.

In general, the dichroic film formed by stacking a plurality of dielectric films has an angular dependency that the reflectance with respect to light is different by the incident angle. The dichroic film 34 in the present embodiment also has the angular dependency that the reflectance with respect to the excitation light B is different by the incident angle.

Figure 5:
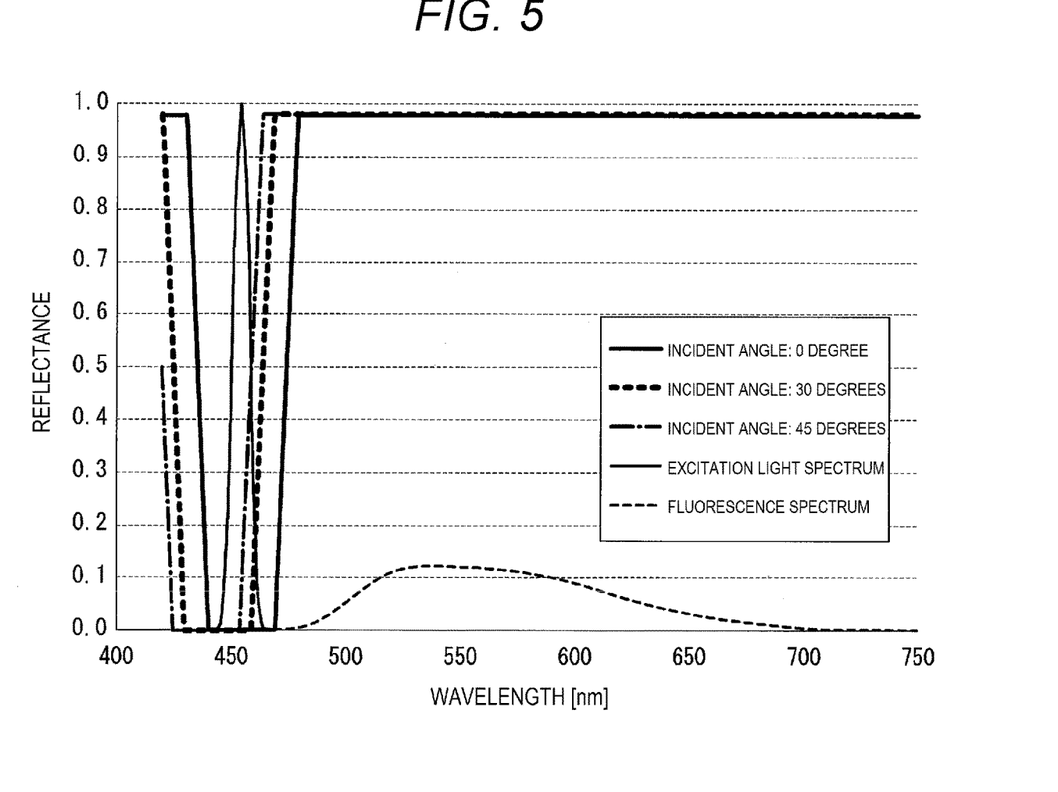
FIG. 5 is a graph showing angular dependency of a dichroic film.

FIG. 5 is a graph showing the angular dependency of the dichroic film 34. In FIG. 5, the horizontal axis represents the wavelength of the incident light, and the vertical axis represents the reflectance. FIG. 5 shows the reflectance characteristic of the dichroic film 34 at the incident angles of 0 degree, 30 degrees, and 45 degrees. In FIG. 5, there are illustrated the emission spectra of the excitation light B and the fluorescence Y.

As shown in FIG. 5, the dichroic film 34 in the present embodiment rises in reflectance with respect to the excitation light B as the incident angle of the excitation light B increases. For example, when the incident angle is 45 degrees, the reflectance with respect to the peak wavelength (455 nm) of the excitation light B in the dichroic film 34 is substantially 20%. When the incident angle of the excitation light B becomes larger than 45 degrees, the reflectance with respect to the peak wavelength of the excitation light B in the dichroic film 34 becomes higher than 20%, and it becomes unachievable for the dichroic film 34 to efficiently transmit the excitation light B. As a result, the light intensity of the fluorescence Y generated in the wavelength conversion layer 32 decreases.

In contrast, in the light source device 2 according to the present embodiment, the incident angle of the excitation light B with respect to the dichroic film 34 is set no larger than 45 degrees, and preferably no larger than 30 degrees. Since the light guide 12 in the present embodiment has a prismatic shape as described above, no angular variation occurs in the excitation light B having entered the light guide 12 through the plane of incidence of light 12a in the process of being propagated through the light guide 12 and then emitted from the light exit surface 12b.

The exit angle of the excitation light B emitted from the light exit surface 12b is equal to the incident angle of the excitation light B with respect to the plane of incidence of light 12a. Further, the incident angle of the excitation light B with respect to the dichroic film 34 is equal to the exit angle of the excitation light B from the light exit surface 12b. In other words, the incident angle $\theta 1$ of the excitation light B with respect to the dichroic film 34 is equal to the incident angle $\theta 2$ of the excitation light B with respect to the plane of incidence of light 12a.

In the light source device 2 according to the present embodiment, the incident angle $\theta 2$ of the excitation light B with respect to the plane of incidence of light 12a of the light guide 12 is set no larger than 45 degrees, and preferably no larger than 30 degrees. The incident angle $\theta 2$ of the excitation light B with respect to the plane of incidence of light 12a of the light guide 12 can be adjusted by the lens power of the condenser lens 11.

In the light source device 2 according to the present embodiment, by adjusting the incident angle of the excitation light B with respect to the plane of incidence of light 12a of the light guide 12 so that the excitation light B enters the dichroic film 34 at a predetermined angle, it is possible to make the excitation light B efficiently enter the wavelength conversion layer 32 without being reflected by the dichroic film 34. Therefore, it is possible for the light source device according to the present embodiment to increase the fluorescence conversion efficiency of the wavelength conversion layer 32.

As described above, according to the light source device 2 related to the present embodiment, since the light exit surface 12b of the light guide 12 and the plane of incidence of light 13a of the fluorescence emitting element 13 are disposed at a distance, it is possible to prevent the fluorescence Y generated in the fluorescence emitting element 13 from being guided toward the light guide 12. Therefore, the light source device 2 according to the present embodiment efficiently use the fluorescence Y as the illumination light WL, and can therefore improve the high light use efficiency.

Further, according to the light source device 2 related to the present embodiment, since the light exit surface 12b of the light guide 12 and the plane of incidence of light 13a of the fluorescence emitting element 13 are disposed at a distance, it is possible to prevent the heat generated in the fluorescence emitting element 13 from being transferred to the light guide 12. Therefore, the deterioration in reliability of the light guide 12 due to the exposure to the heat is prevented.

Further, according to the light source device 2 related to the present embodiment, since the plane of incidence of light 13a is larger than the light exit surface 12b, it is possible to efficiently take the excitation light B in the plane of incidence of light 13*a*. Therefore, it is possible to efficiently generate the fluorescence Y in the fluorescence emitting element 13.

Further, according to the projector 1 related to the present embodiment, since the light source device 2 described above is provided, the light use efficiency is high, and therefore, it is possible to display a bright image.

It should be noted that the scope of the present disclosure is not limited to the embodiment described above, but a variety of modifications can be provided thereto within the scope or the spirit of the present disclosure.

For example, in the embodiment described above, there is described the example in which the radiator substrate 17 is thermally coupled to the support substrate 31 of the fluorescence emitting element 13, but it is possible for the radiator substrate 17 to thermally be coupled to both of the support substrate 31 and the wavelength conversion layer 32.

Figure 6:
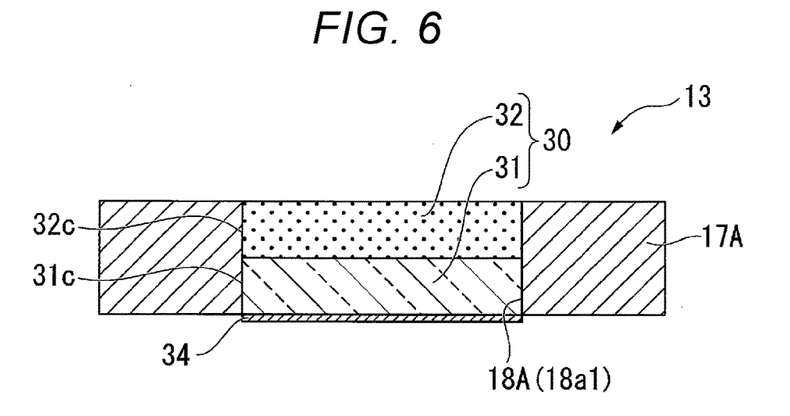
FIG. 6 is a cross-sectional view showing a peripheral structure of a radiator substrate related to a modified example.

FIG. 6 is a cross-sectional view showing a peripheral structure of a radiator substrate related to a modified example.

As shown in FIG. 6, in the present modified example, the radiator substrate 17A supports the fluorescence emitting element 13, and is at the same time thermally coupled to both of the support substrate 31 and the wavelength conversion layer 32. Specifically, the radiator substrate 17A is provided with the fluorescence emitting element 13 disposed inside the through hole 18A. The inner surface 18*a*1 of the through hole 18A is thermally coupled to the side surface 31*c* of the support substrate 31 and the side surface 32*c* of the wavelength conversion layer 32.

When adopting the radiator substrate 17A in the present modified example, since the radiator substrate 17A is thermally coupled to both of the support substrate 31 and the wavelength conversion layer 32, it is possible to further improve the radiation performance of the wavelength conversion layer 32.

Further, the fluorescence emitting element 13 in the embodiment described above has the support substrate 31 on the plane of incidence of light 32*a* of the wavelength conversion layer 32, but can be provided with a structure of having another support substrate 31 on the light exit surface 32*b* of the wavelength conversion layer 32. In other words, it is possible to adopt a structure in which the wavelength conversion layer 32 is sandwiched by the pair of support substrates 31.

Further, although in the embodiment described above, there is cited the light guide 12 having a prismatic shape as an example, it is possible to use a light guide formed of a taper rod having the area of a cross-sectional surface perpendicular to the central axis varying in a direction from the plane of incidence of light 12*a* toward the light exit surface 12*b*. Further, the light guide 12 having a solid structure is cited as an example in the embodiment described above, but it is possible to use the light guide 12 having a hollow structure.

Further, although in the embodiment described above, the dichroic film 34 is disposed on the entire area of the first surface 31*a* of the support substrate 31, it is possible for the dichroic film 34 to be disposed only in an area which the excitation light B enters, namely only in a part exposed to the inside of the through hole 18.

Further, although in the embodiment described above, the dichroic film 34 is disposed on the first surface 31*a* of the support substrate 31, it is possible for the dichroic film 34 to be disposed on the second surface 31*b* of the support substrate 31.

Besides the above, the numbers, the shapes, the materials, the arrangement, and so on of the constituents constituting the fluorescence emitting element 13 and the light source device 2 can arbitrarily be modified. Further, although in the embodiments described above, there is illustrated the projector provided with the three light modulation devices, the present disclosure can also be applied to a projector for displaying a color image using a single light modulation device. Further, the light modulation device is not limited to the liquid crystal panel described above, but a digital mirror device, for example, can also be used.

Besides the above, the shapes, the numbers, the arrangement, the materials, and so on of the variety of constituents of the projector are not limited to those of the embodiment described above, but can arbitrarily be modified.

Further, although in the embodiment described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
an excitation light source configured to emit first light in a first wavelength band;
a first optical element configured to collect the first light emitted from the excitation light source;
a second optical element having a first plane of incidence which the first light collected by the first optical element enters, and a first exit surface different from the first plane of incidence, and configured to guide the first light entering the second optical element through the first plane of incidence to emit the first light from the first exit surface;
a wavelength conversion element having a second plane of incidence which the first light emitted from the first exit surface of the second optical element enters, and a second exit surface different from the second plane of incidence, and configured to convert the first light entering the wavelength conversion element through the second plane of incidence into second light having a second wavelength band different from the first wavelength band; and
a first substrate configured to hold the wavelength conversion element and thermally coupled to the wavelength conversion element while not having contact with the second optical element, wherein
the second optical element and the wavelength conversion element are disposed in a state in which the first exit surface and the second plane of incidence are opposed to each other at a distance from each other, and
the second plane of incidence is larger in size than the first exit surface.

2. The light source device according to claim 1, wherein
the second optical element has a side surface crossing the first plane of incidence and the first exit surface,
the first substrate has a first surface opposed to the side surface, and
the side surface and the first surface of the first substrate are disposed at a distance from each other.

3. The light source device according to claim 2, wherein
a gap between the side surface and the first surface is larger in size than a gap between the first exit surface and the second plane of incidence.

4. The light source device according to claim 1, wherein the wavelength conversion element has a first film which is disposed on the second plane of incidence, transmits the first light, and reflects the second light.

5. The light source device according to claim 2, wherein the wavelength conversion element has a first film which is disposed on the second plane of incidence, transmits the first light, and reflects the second light.

6. The light source device according to claim 3, wherein the wavelength conversion element has a first film which is disposed on the second plane of incidence, transmits the first light, and reflects the second light.

7. The light source device according to claim 1, wherein the wavelength conversion element includes
a wavelength conversion layer configured to perform wavelength conversion of the first light entering the wavelength conversion element through the second plane of incidence into the second light, and
a second substrate which holds the wavelength conversion layer, and is thermally coupled to the wavelength conversion layer, and has a light transmissive property.

8. The light source device according to claim 2, wherein the wavelength conversion element includes
a wavelength conversion layer configured to perform wavelength conversion of the first light entering the wavelength conversion element through the second plane of incidence into the second light, and
a second substrate which holds the wavelength conversion layer, and is thermally coupled to the wavelength conversion layer, and has a light transmissive property.

9. The light source device according to claim 3, wherein the wavelength conversion element includes
a wavelength conversion layer configured to perform wavelength conversion of the first light entering the wavelength conversion element through the second plane of incidence into the second light, and
a second substrate which holds the wavelength conversion layer, and is thermally coupled to the wavelength conversion layer, and has a light transmissive property.

10. The light source device according to claim 4, wherein the wavelength conversion element includes
a wavelength conversion layer configured to perform wavelength conversion of the first light entering the wavelength conversion element through the second plane of incidence into the second light, and
a second substrate which holds the wavelength conversion layer, and is thermally coupled to the wavelength conversion layer, and has a light transmissive property.

11. The light source device according to claim 5, wherein the wavelength conversion element includes
a wavelength conversion layer configured to perform wavelength conversion of the first light entering the wavelength conversion element through the second plane of incidence into the second light, and
a second substrate which holds the wavelength conversion layer, and is thermally coupled to the wavelength conversion layer, and has a light transmissive property.

12. The light source device according to claim 6, wherein the wavelength conversion element includes
a wavelength conversion layer configured to perform wavelength conversion of the first light entering the wavelength conversion element through the second plane of incidence into the second light, and
a second substrate which holds the wavelength conversion layer, and is thermally coupled to the wavelength conversion layer, and has a light transmissive property.

13. A projector comprising:
the light source device according to claim 1;
a light modulation device configured to modulate light from the light source device in accordance with image information to thereby form image light; and
a projection optical system configured to project the image light.

14. The projector according to claim 13, wherein
the second optical element has a side surface crossing the first plane of incidence and the first exit surface,
the first substrate has a first surface opposed to the side surface, and
the side surface and the first surface of the first substrate are disposed at a distance from each other.

15. The projector according to claim 14, wherein
a gap between the side surface and the first surface is larger in size than a gap between the first exit surface and the second plane of incidence.

16. The projector according to claim 13 wherein
the wavelength conversion element has a first film which is disposed on the second plane of incidence, transmits the first light, and reflects the second light.

17. The projector according to claim 13 wherein
the wavelength conversion element includes
a wavelength conversion layer configured to perform wavelength conversion of the first light entering the wavelength conversion element through the second plane of incidence into the second light, and
a second substrate which holds the wavelength conversion layer, and is thermally coupled to the wavelength conversion layer, and has a light transmissive property.

18. The light source device according to claim 1, wherein
the second optical element has a side surface; and
the first substrate has an inner surface which forms the size of the second plane of incidence of the wavelength conversion element, and which forms a recess for receiving an end of the second optical element disposed in a state in which the first substrate inner surface and the second optical element side surface are opposed to each other at a distance from each other.

* * * * *